INVENTOR
GUIDO BERTOGLIO

BY
ATTORNEY

INVENTOR
GUIDO BERTOGLIO
BY
ATTORNEY

Nov. 15, 1966 G. BERTOGLIO 3,285,113
MACHINE FOR AUTOMATICALLY CUTTING STRIPS OF ADJUSTABLE
LENGTH AND WIDTH STARTING FROM A SHEET OR FROM A ROLL
Filed Feb. 10, 1965 6 Sheets-Sheet 6

INVENTOR
GUIDO BERTOGLIO

BY
ATTORNEY 3,285,113
MACHINE FOR AUTOMATICALLY CUTTING STRIPS OF ADJUSTABLE LENGTH AND WIDTH STARTING FROM A SHEET OR FROM A ROLL
Guido Bertoglio, Viganello, Switzerland, assignor to Brevetex Anstalt, Eschen, Liechtenstein
Filed Feb. 10, 1965, Ser. No. 433,252
Claims priority, application Switzerland, May 4, 1962, 5,409/62
1 Claim. (Cl. 83—255)

The present invention relates to a machine for automatically cutting strips of desired length and width starting from a sheet or from a roll, and is a continuation-in-part of my U.S. patent application Serial No. 246,224, filed December 20, 1962, now abandoned. Said machine is characterized by:

A pair of guillotine blades provided with a reciprocating synchronized motion in phase opposition, each blade having a cutting edge disposed obliquely with respect to the sheet to be cut and having an opposite inclination so that during the whole cutting operation the sheet be always disposed along the bisecting line of the angle formed by the two above-mentioned cutting edges;

A device for pre-setting the sheet to be cut, thereby ensuring the start of the cutting operation in synchronism and in phase with respect to the position of the blades;

A driving device for feeding the sheet to be cut comprising at least three pairs of driving rollers, one pair being disposed after the pre-setting device, another pair being located before the blades and the last one being disposed after the blades, the distance of the axes of the two rollers forming each pair being adjustable in a vertical direction;

At least a pair of shafts supporting a plurality of cutting disks mounted thereon in adjustable or variable position for longitudinally cutting the sheet;

A stationary shaft or cross member supporting bordering, marking and pressing members in adjustable or variable position;

An intermittent feeding device for the sheet having braking members arranged to stop the sheet at the moment the cutting operation takes place;

Control members whereby the cross cut effected by the guillotine blades may be eliminated and cutting disks are included to effect the longitudinal cutting operation or vice versa.

Figure 1:
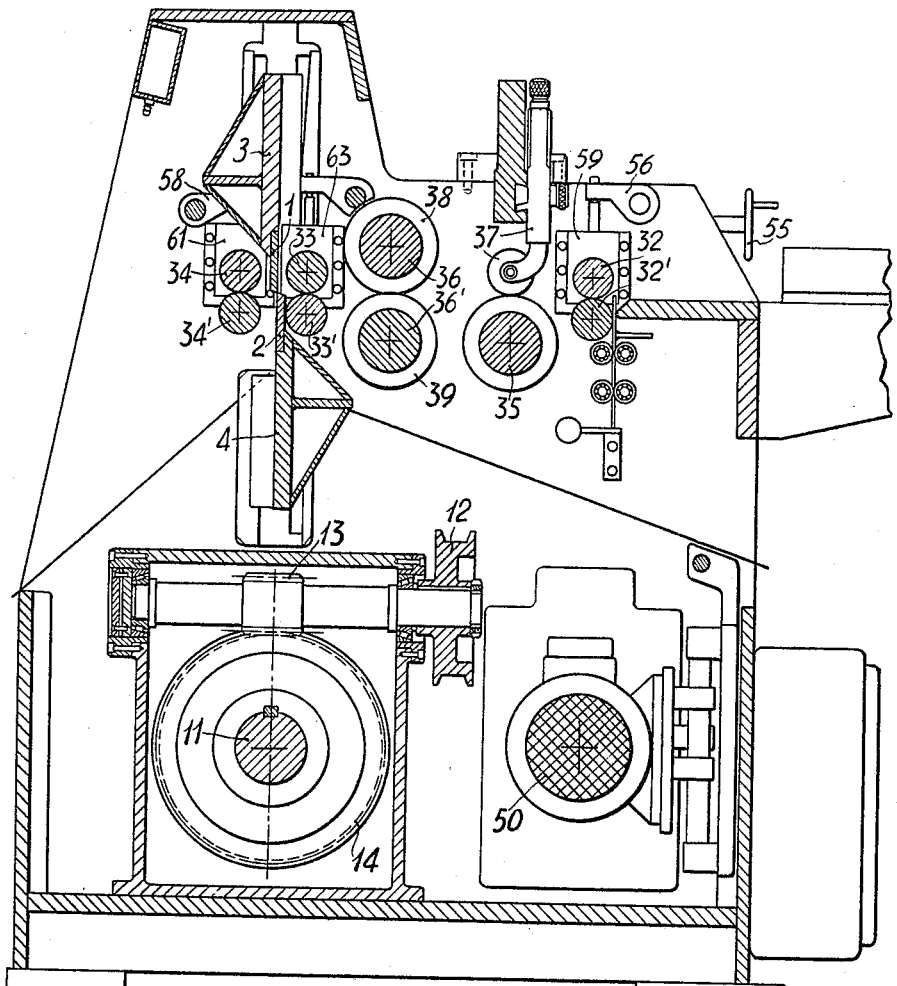
Figure 2:
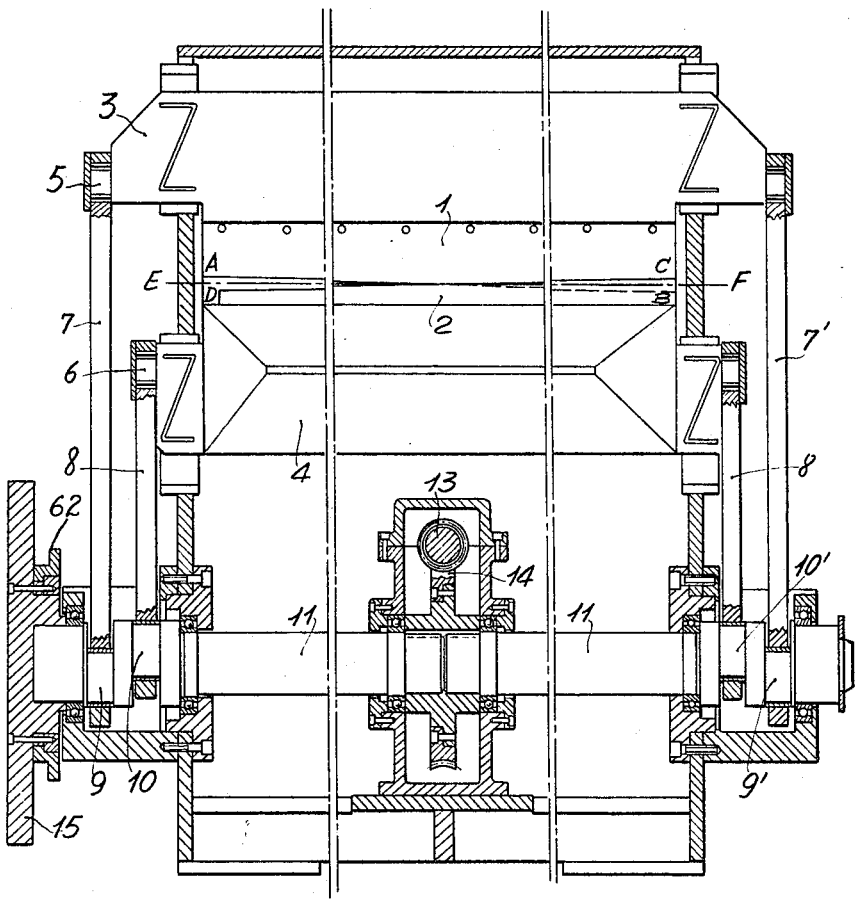
Figures 3, 3A:
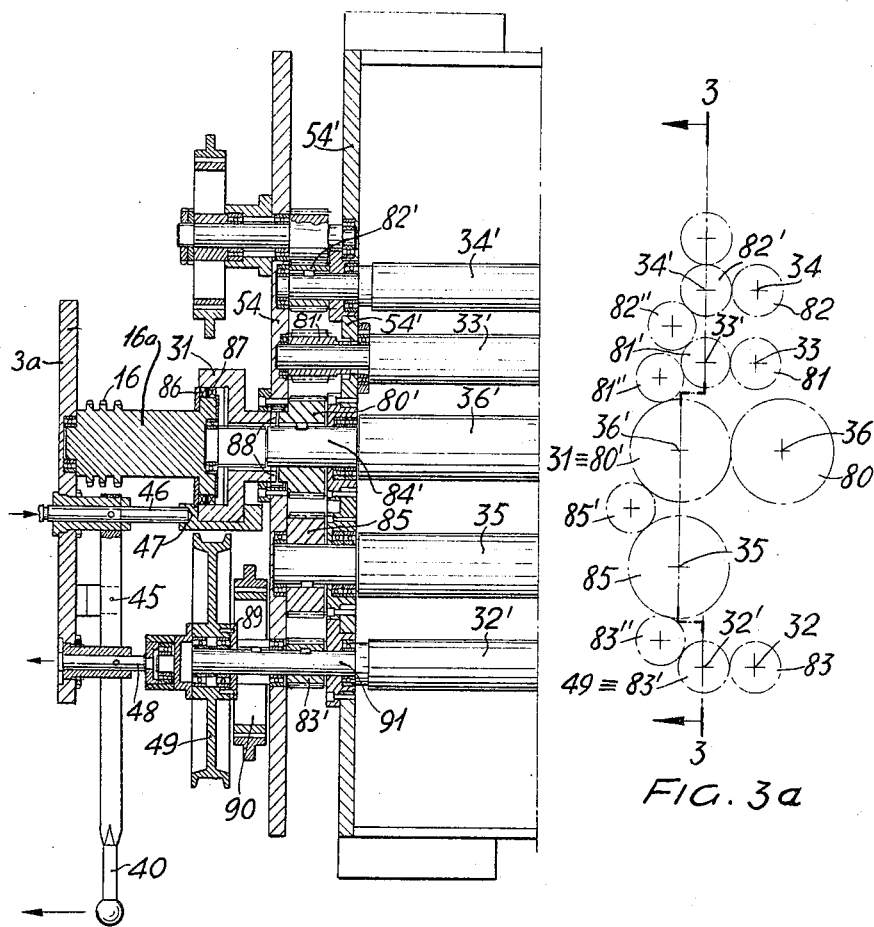

The features of novelty which I believe to be characteristic of my invention are set forth with particularity in the appended claim. My invention itself, however, both as to its fundamental principles and as to its particular embodiments, will best be understood by reference to the specification and accompanying drawing, in which FIG. 1 is a longitudinal section passing through the axis of the machine, FIG. 2 is a cross section taken through the drive shaft imparting the reciprocating motion to the blades, FIG. 3 is a top view on the section taken along the horizontal plane passing through the axes of the upper drive rollers, FIG. 3a is a diagrammatic view showing the various rolls and gears connecting the feed rolls in such a manner that they all operate at the same peripheral speed. In this figure, the sign ≡ is to be read as "drives."

Figure 4:
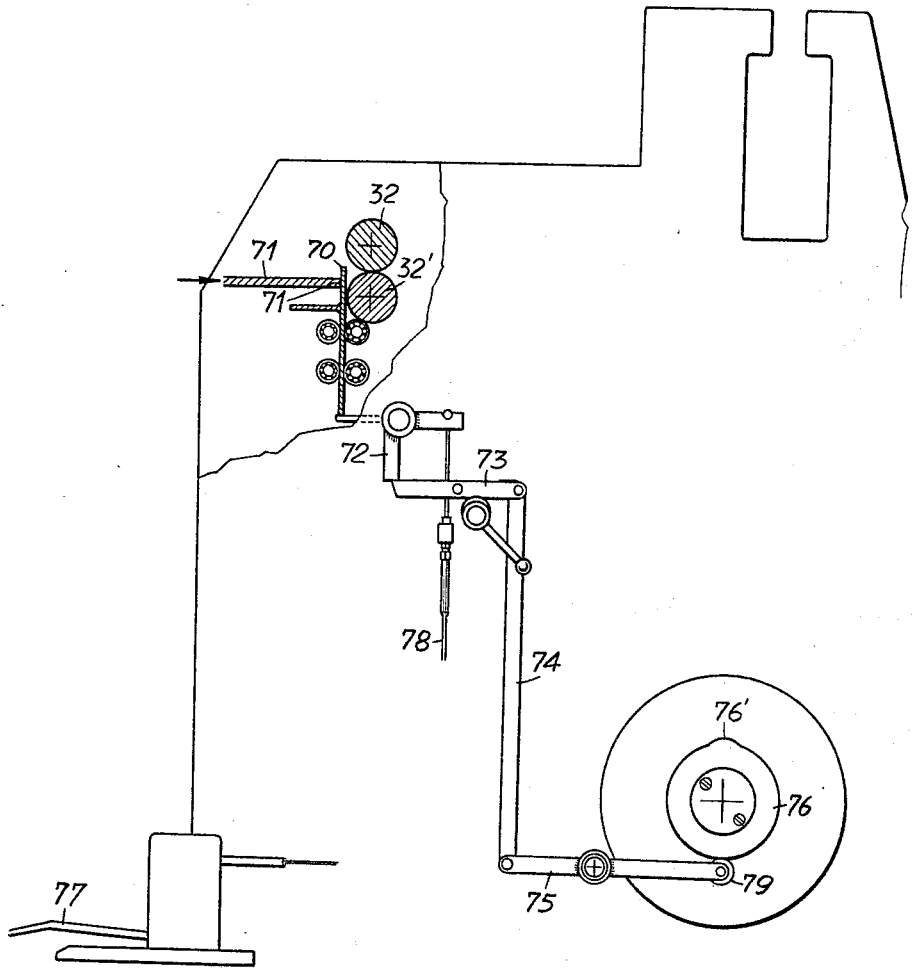
Figure 5:
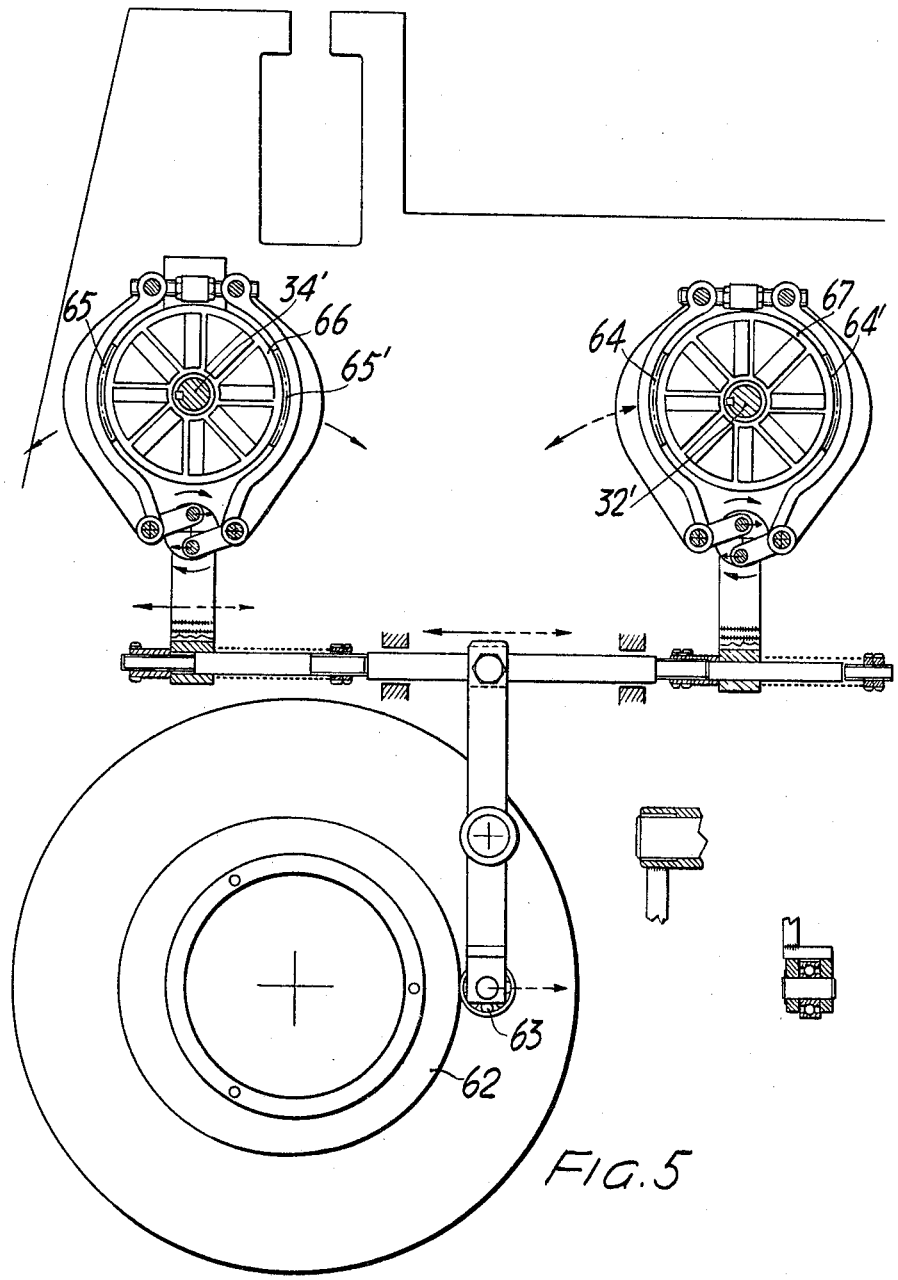
Figures 6, 7:
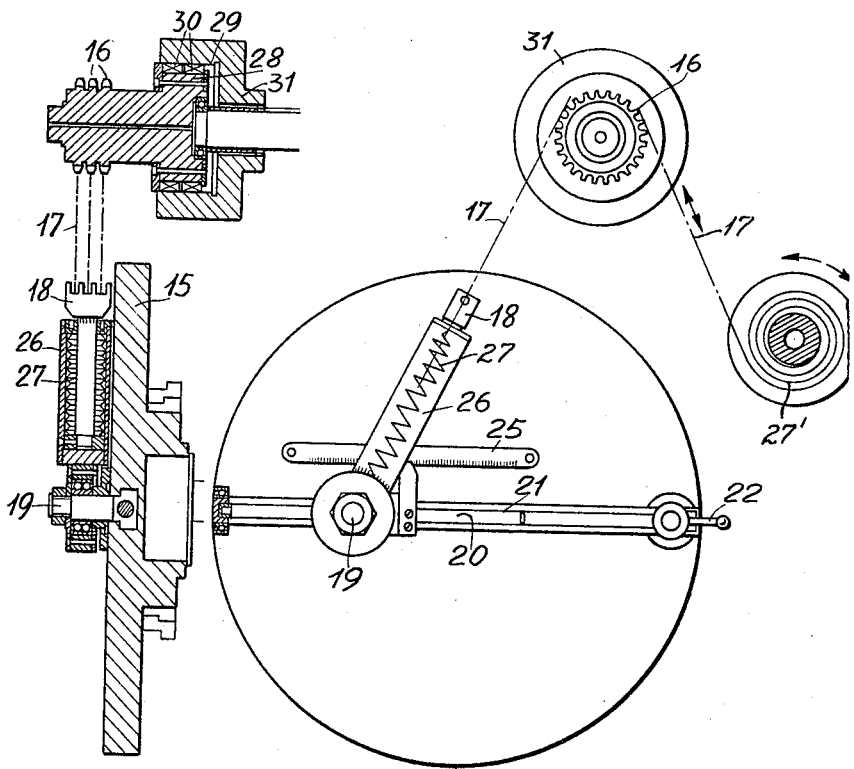
Figure 8:
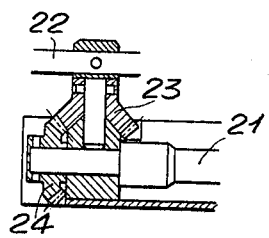

FIG. 4 is a diagrammatic lateral view of the members controlling the pre-setting device for the sheet to be cut, FIG. 5 is a view of the braking members for stopping the intermittent feed device for the sheet at the moment the cutting takes place, FIG. 6 is a diagrammatic front view of the mechanism intermittently feeding the sheet, FIG. 7 is a tear preventing device (a side view of the mechanism of FIG. 6), and FIG. 8 is a detail of the mechanism controlling the adjustment of the mechanism of FIG. 6.

The machine of the invention comprises, as shown in FIGS. 1 and 2, a pair of guillotine blades 1 and 2 operating in phase opposition and respectively supported by frame portions 3 and 4, which blades are driven in reciprocating synchronized motion with a phase displacement of 180° (i.e. in opposition) by the shafts 5 and 6 which receive the motion from a first pair of connecting rods 7 and 8 through the eccentrics 9 and 10.

A second pair of connecting rods 7' and 8', respectively driven by the eccentrics 9' and 10', is located at the opposite side of the frames 3 and 4 to ensure a greater stability. The whole system is driven by the shaft 11 which is set into motion by a suitable pulley or motor 12 through the cooperating unit formed by the worm 13 and the associated wheel 14 keyed to shaft 11. At one end of the shaft 11 is fixed the disk 15 having those members mounted thereon which provide for the intermittent feeding of the sheet and which are shown in more detail in FIGS. 6 and 7.

An important feature is that the two guillotine blades 1 and 2 (FIG. 2) are inclined and each has a cutting edge A–B and C–D respectively, the inclination of which is equal but opposite with respect to the bisecting line E–F along which is located the sheet to be cut. During the whole cutting operation it is thus possible to have the sheet always disposed in the middle line (i.e. on the bisecting line E–F) with respect to the two cutting edges (A–B and C–D), whereby the cutting operation is effected in a perfect manner without causing any deformation of the sheet.

The device controlling the intermittent feed motion shown in FIGS. 6 and 7 comprises the sprocket wheel 16 mounted on shaft 16a, having its outer end mounted in bearings in a part of the frame 3a of the machine, and having an enlarged inner end mounted for rotation in a recess 29 in the end of cylinder 31 which drives roll 36'. Sprocket wheel 16 is engaged with chain 17 connected to the tear preventer 18 and to the crank 19, the position of which may be micrometrically adjusted with respect to the center of the shaft 11 of disk 15 by means of the screw 21 operated by the handwheel 22 through the gears 23 and 24 shown in FIG. 8. The end of chain 17 that is reeved about wheel 16 is dead-ended on a spring 27' that maintains tension in chain 17 and maintains chain 17 in contact with wheel 16, in a manner well known in the art, as shown for example in U.S. Patent No. 1,667,-187. The hand wheel 22 is operated only to determine the length of the strips to be cut. By varying the eccentricity of crank 19 with respect to the shaft 11, it is possible to vary the amplitude of the intermittent feed derived from the continuous movement of disk 15 and therefore the length of the cut strips, said length being readable on the graduated scale 25.

How the intermittent feed works will now be described. If hand wheel 22 is adjusted so that crank 19 is on the axis of disk 15 (FIG. 6), rotation of the latter will not produce movement of crank 19 and its associated cylinder 26, no turning force will be transmitted from disk 15 through chain 17 to sprocket 16 (FIG. 7), thence to cylinder 31 and, through the meshed gears shown in FIG.

3a to the various feed rolls. With such adjustment, the strip feed amplitude is zero.

If, however, hand wheel 22 is now turned, to move crank 19 and its associated cylinder 26 away from center (i.e., to the left as seen in FIG. 6), crank 19 is moved radially outward with respect to disk 15 and will now move in a circular path, the radius of the circle in which it moves being the greater the farther crank 19 is moved from the center. Crank 19 is mounted on bearings 19″ for rotation on disk 15. As seen in FIG. 6, chain 17 moves longitudinally with a reciprocating motion (neglecting the lateral motion of crank 19 imparted to it as disk 15 rotates).

By means of locking and unlocking mechanism between wheel 16 and cylinder 31, of the over-running clutch type which will be described hereinafter, this reciprocal motion of chain 17 drives cylinder 31 intermittently in one direction only (clockwise) and this intermittent drive is imparted to the feed rolls, which are geared together, as shown in FIG. 3a, as described hereafter.

The tear preventing device 18 comprises the cylinder 26 having therein the elastic members 27 which provide a resilient rather than an inelastic connection between disk 15 and shaft 16a.

The lock or release device 28, 29 (FIG. 7) is coaxially disposed with respect to the toothed wheel 16 in recess 29, and consists in a conventional way of a wheel 28 in a cylindrical cavity 29 in a cylinder 31 with intermediately disposed (interposed) oval rollers 30. By partial rotation, said oval rollers are partly rotated and exert a wedging action between the wheel 28 and the cylinder 31, thus providing a locked connection of the wheel with the cylinder 31 in one direction of rotation of wheel 16, and an unlocked, or free rotation of said connection in the opposite direction. This is frequently termed a "one way" or "over-running" clutch.

The feeding device for the sheet to be cut comprises (FIGS. 1 and 3) three pairs of rollers 32–32′, 33–33′, 34–34′. The shafts 35 and 36–36′ are disposed in a position intermediate between the first two pairs of rollers.

For clarity, the drive may be traced as follows on FIG. 3: Pulley 49 drives roll 32′ through shaft 91, and, through gear 83′, meshing with gear 83, attached to roll 32, drives the latter. Gear 83″ meshes with gear 83′ and in turn with gear 85, which drives roll 35. Gear 85 also meshes with gear 85′, which in turn meshes with gear 80′, which is driven intermittently by cylinder 31. Gear 80′ meshes with gear 80, which drives roll 36.

Gear 80′ meshes with gear 81″, which meshes with gear 81′, driving roll 33′, and the latter meshes with gear 81, driving roll 33. Gear 82″ meshes with gear 82′, driving roll 34′, and gear 82′ meshes with gear 82, driving roll 34.

The shaft 35 carries and cooperates with the marking, bordering and pressing members 37 provided for engraving a trace or mark in the sheet to be cut immediately before the cutting is effected, said trace or mark serving to facilitate the successive folding of the strip when this last is going to be cut.

The pair of shafts 36–36′ carry cutting diskc 38–39 mounted thereon, said disk being effective to longitudinally cut the strips, while the guillotine blades 1–2 effect the cross cut of the same.

It should be noted that the pairs of drive rollers 32–32′ and 33–33′ are disposed before the blades 1 and 2 while the pair of rollers 34–34′ is located after said blades and provides for the feed motion of the strip which has already been cut and which therefore could not be pushed by the pair of rollers 33–33′ when the sheet has come to its end.

To allow for the longitudinal cut only while eliminating the cross cut effected by the blades 1 and 2 there is provided a lever 40 (FIG. 3) which, being pivotedly mounted at 45, is movable from left to right to move cylinder 31 to the left to disengage the drive connection 88 and interrupt the intermittent drive of the feed rolls, described above, and to move pulley 49 to the right to establish the drive connection 89 to provide continuous drive for the feed rolls and for the cutting disks 38 and 39. Movement of lever 40 from right to left has the opposite effect, that is, to interrupt the continuous drive and establish the intermittent drive. Of course, when cutting disks 38 and 39 are to be inactivated, they must be moved apart and means (not shown) similar to means 55–61 are provided for this purpose.

The blades 1–2 have the motion imparted thereto by means of a suitable motor driven pulley 12 driven by a separate motor (not shown) and operating independently from the motor 50 driving the pulley 49, whereby it is made possible to effect both the cross cutting and the longitudinal cutting, in one passage of stock through the machine, or to effect one or the other as desired by selective operation of one or the other of the motors.

The device providing for the micrometric lifting of the upper rollers 32, 33 and 34 for the purpose of adjusting the pressure between the rolls or for accommodating the sheet thickness is shown in FIG. 1 and comprises the hand wheel 55 which, by rotation, simultaneously operates the levers 56, 57 and 58 through a screw drive system to move the roller supporting slides 59, 60 and 61 in a vertical direction.

To prevent the strip to be cut from going beyond its correct cutting position as a consequence of its inertia, there is provided a double shoe brake as shown in FIG. 5, said brake being acted upon by the cam 62 through follower 63 tightening the shoes 64, 64′ and 65, 65′ around the pulleys 66 and 67 which are coaxial with the shafts of the rollers 32′ and 34′ driving the sheet, whereby the latter is blocked or stopped in the exact position in which the cross cutting is to be effected.

To have a more reliable operation, the cam 62 is so formed and fixed with respect to the shaft 11 driving the lifting and lowering of the blades that it progressively acts upon the shoe brakes whereby the braking action starts with an advance of 90° with respect to the cutting position, and is proportional to the deceleration.

An important part of the invention is also constituted by the device for pre-setting the sheet to be cut (FIG. 4) comprising the stop member 70 having the front edge 71′ of the sheet to be cut rest thereagainst, whereby said stop member may be lifted and lowered by means of the system of levers 72–73–74–75 driven by cam 76 which is synchronized with the shaft 11 operating the guillotine blades 1 and 2. By having the end 71′ of sheet 71 come into contact with member 70 and by lowering the pedal 77 acting on the flexible cable 78 in such a direction as to operate the lifting of the member 70, it is possible to pre-set the sheet to enter into the working cycle only in the moment in which the projection 76′ of the cam 76 strikes against the follower 79, thereby allowing for the lowering of the member 70 and the beginning of the driven movement of the sheet 71 towards the blades.

This is an important characteristic which economizes the sheet as much as possible since it makes possible to have no sheet portions to be discarded at the end of the working.

It should be noted that, if no synchronism is provided for, such a discard would be inevitable.

In the foregoing, I have shown and described certain preferred embodiments of my invention, and the best mode presently known to be for practising the same, but will be understood that modifications and changes may be made without departing from the spirit and scope of my invention, as will be clear to those skilled in the art.

I claim:

Apparatus for cutting pieces from a strip, comprising a pair of guillotine blades, means for intermittently moving strip material along a plane between the blades, the blades having cutting edges disposed at opposite acute angles with respect to said plane, means for reciprocating both of the blades toward and away from each other so that the cutting edges of the blades intersect in said plane throughout the cutting operation in synchronism with said intermittent moving means to cut pieces from the strip when the strip is stationary between periods of movement of the strip, means for continuously moving said strip along said plane, a further cutting blade for forming at least one cut through the strip extending lengthwise of the strip, and means for selectively simultaneously actuating said intermittent moving means and said guillotine blades and for deactuating said continuous moving means and further cutting blade, or for deactuating said intermittent moving means and said guillotine blades and actuating said continuous moving means and said further cutting blade.

References Cited by the Examiner

UNITED STATES PATENTS

| | | | |
|---|---|---|---|
| 257,286 | 5/1882 | Bruce | 83—636 X |
| 509,989 | 12/1893 | Wilton | 83—623 |
| 677,518 | 7/1901 | Jacobs | 83—408 X |
| 1,241,267 | 9/1917 | Hawthorne | 226—177 X |
| 1,785,546 | 12/1930 | Flett | 226—117 X |
| 2,144,930 | 1/1939 | Payne | 226—117 |
| 2,216,629 | 10/1940 | Sabel et al. | 83—245 X |
| 2,602,665 | 7/1952 | Fulk | 83—255 X |
| 2,613,706 | 10/1952 | Smith | 226—177 X |
| 2,701,013 | 3/1955 | Klasing | 83—255 |
| 2,765,847 | 10/1956 | Conant | 83—245 |

WILLIAM W. DYER, JR., *Primary Examiner.*

J. M. MEISTER, *Assistant Examiner.*